US012394300B1

(12) United States Patent
Arndt et al.

(10) Patent No.: US 12,394,300 B1
(45) Date of Patent: *Aug. 19, 2025

(54) PROVIDING LOCATION-BASED SAFETY ALERTS

(71) Applicant: UIPCO, LLC, San Antonio, TX (US)

(72) Inventors: Michael Clinton Arndt, Valrico, FL (US); Rosa Maria Smith, San Antonio, TX (US); Nolan Serrao, Plano, TX (US); Olamide Oluwatomi Fanilola, Frisco, TX (US); Ana Rosa Maldonado, San Antonio, TX (US); Megan Sarah Jennings, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 440 days.

This patent is subject to a terminal disclaimer.

(21) Appl. No.: 17/724,778

(22) Filed: Apr. 20, 2022

Related U.S. Application Data

(60) Provisional application No. 63/177,537, filed on Apr. 21, 2021.

(51) Int. Cl.
| | |
|---|---|
| *G08B 25/01* | (2006.01) |
| *G08B 25/08* | (2006.01) |
| *G08B 27/00* | (2006.01) |
| *H04W 4/02* | (2018.01) |

(52) U.S. Cl.
CPC .......... *G08B 25/016* (2013.01); *G08B 25/08* (2013.01); *G08B 27/005* (2013.01); *H04W 4/025* (2013.01)

(58) Field of Classification Search
CPC ..... H04W 4/025; G08B 25/016; G08B 25/08; G08B 27/005
USPC ...................................... 455/404.2
See application file for complete search history.

(56) References Cited

U.S. PATENT DOCUMENTS

| | | | | |
|---|---|---|---|---|
| 2018/0184236 A1* | 6/2018 | Faraone | .................. | H04W 4/08 |
| 2018/0232904 A1* | 8/2018 | Zakharevich | ............. | G06T 7/70 |
| 2020/0250541 A1* | 8/2020 | Kim | ....................... | G06N 3/045 |

* cited by examiner

*Primary Examiner* — Joel Ajayi
(74) *Attorney, Agent, or Firm* — Potomac Law Group, PLLC; Dannon G. Allbee

(57) ABSTRACT

A location-based safety alert system can gather data describing potential health- and safety-related issues at various geographic locations (e.g., crime statistics, disease spread rates, weather reports, and travel advisories). The location-based safety alert system can develop models that characterize how dangerous a location is based on the data describing it. The location-based safety alert system can apply the model, as circumstances at a location change, to compute danger scores that reflect how dangerous the location is at that time. Using the danger scores, the location-based safety alert system can alert users of dangers present in areas of interest to them (e.g., where they will be traveling to soon, where they have family members living, or where they are presently located). The alerts can notify users of the risk present at a geographic location as well as advise them of services and resources available to mitigate the risk.

20 Claims, 8 Drawing Sheets

PROVIDING LOCATION-BASED SAFETY ALERTS

CROSS-REFERENCE TO RELATED APPLICATION

This application is a non-provisional of and claims priority to U.S. Provisional Application No. 63/177,537, filed on Apr. 21, 2021, titled "PROVIDING LOCATION-BASED SAFETY ALERTS," which is incorporated herein by reference in its entirety.

TECHNICAL FIELD

The present disclosure is directed generally to providing users with safety alerts and related information for areas of interest.

BACKGROUND

Throughout the world, at any given time, various circumstances can create dangerous situations within different geographical areas. For example, a country may be experiencing civil unrest, a region may be in the midst of a disease outbreak, and a severe weather system may be pummeling a city. These situations can pose danger to both persons and property and are fluid, changing with little notice. Furthermore, individuals can find themselves concerned with an increasing number of geographical areas. For example, an individual may, in addition to his or her own current location, have plans to travel to another country, have family living in another state, and/or have an interest in his or her current location. As a result, it can be challenging for individuals to recognize the dangers posed by all of the geographical areas that may affect them.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
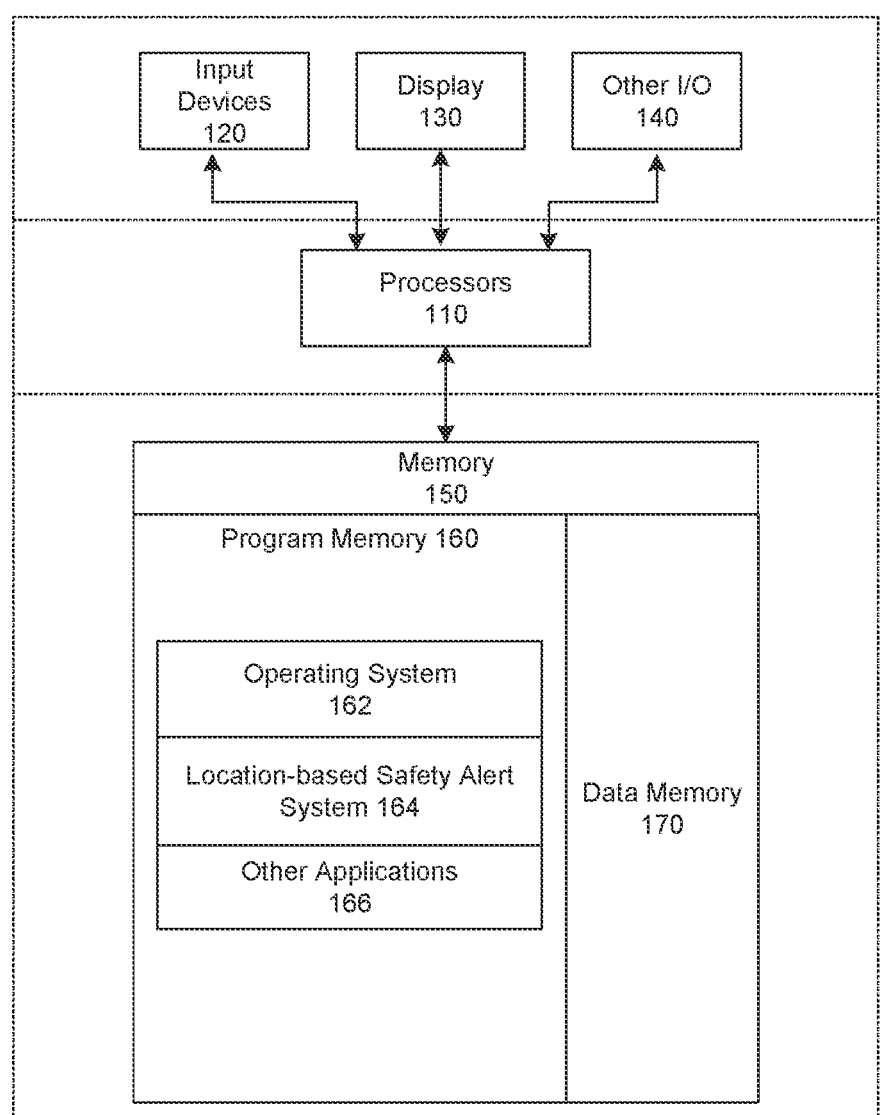
FIG. 1 is a block diagram illustrating an overview of devices on which some implementations of a location-based safety alert system can operate.

A location-based safety alert system that alerts users to safety-related information for certain geographic locations, and associated methods, are disclosed herein. The system utilizes data describing different aspects of geographic locations (herein "location characteristic data") to assess the extent and type of dangers present in a corresponding location (e.g., within a country, region of a country, state, city, and/or some other geographic boundary) at a given time. For example, the location characteristic data can include recent crime statistics, disease spread information, weather or natural disaster warnings, government-issued advisories, news coverage regarding civil unrest, and/or other safety-related information associated with a location. Based on the available location characteristic data, the system generates one or more "danger scores" associated with the corresponding geographic location. A danger score reflects the danger posed to one's person or property at a corresponding location and can reflect one or more different types of danger (e.g., the risk of being the victim of a crime, the risk of catching a disease, the risk of being subjected to extreme weather, etc.). Geographic locations with which a user may be concerned are referred to herein as the user's "areas of interest." The system evaluates the danger scores. Based on such danger scores, the location-based safety alert system can determine whether to alert users to dangers posed in the user's' areas of interest. For example, the system may alert a first user located in New York City due to a spike in the local crime rate and may alert a second user with upcoming travel plans to Bali of a particularly severe monsoon predicted to strike Bali. Such alerts, which can notify the user via a message displayed on a mobile application, an SMS message, an email, a phone call, or some other communication channel, can inform the user of the detected danger as well as advise the user of available resources (e.g., opportunities to purchase travel insurance or other forms of insurance) to mitigate risk.

In some embodiments, the location-based safety alert system can utilize computer modeling techniques to transform large data sets (e.g., location characteristic data) into danger scores. A "model," as used herein, refers to a construct that is trained using training data to make predictions or provide scores for new data items, whether or not the new data items were included in the training data. For example, training data for supervised learning can include items with various parameters and an assigned classification or score. A new data item can have parameters that a model can use to assign a classification or score to the new data item. As another example, a model can be a probability distribution resulting from the analysis of training data, such as a likelihood of a dangerous situation arising in a geographic location. Examples of models include various types of neural networks, support vector machines, Parzen windows, Bayesian networks, clustering, reinforcement learning, probability distributions, decision trees, decision tree forests, and others.

In some embodiments, the model can be determined by applying statistical analyses to a data set (e.g., location characteristic data) to isolate the effect of a particular indicator of potential danger. An example of such a process applies regression to determine the danger score given a set of location characteristic data. In other implementations, a machine learning model can be trained with supervised learning, where the training data includes location characteristic data as input and a desired output, such as a human-labeled score specifying how dangerous the corresponding geographic location is and/or a label for the extent and/or type of danger present. In training the model, a representation of a training item's location characteristics can be provided to the model (e.g., as a collection of words and/or as a set of factors specifying crime reports, news of civil unrest, reports of property damage, weather reports, reports of deaths or other forms of personal harm, etc.). Output from the model (e.g., danger scores) can be compared to the desired output for that location (the score label(s) assigned to that location) and, based on the comparison, the model can be modified, such as by changing weights between nodes of a neural network or parameters of the functions used at each node in the neural network (e.g., applying a loss function). After applying each of the location characteristics in the training data and modifying the model in this manner, the model can be trained to evaluate new locations or locations with different characteristics. In some implementations, the training of a model can be updated at a later point using additional training data determined for a particular location. In some implementations, such individualized training items can be given higher weight in the statistical or machine learning model than the more general training data items.

In some embodiments, the location-based safety alert system can utilize heuristics to transform large data sets (e.g., location characteristic data) into danger scores. For example, a human operator can configure the system to evaluate location characteristic data a certain way and/or to generate specified danger scores.

The location-based safety alert system evaluates location characteristic data (e.g., using models and/or heuristics) to generate danger scores for corresponding geographic locations. For example, the location-based safety alert system can generate danger scores for a neighborhood in a city, for a city as a whole, for a state or region in a country, and/or for a country. The location-based safety alert system can generate the danger scores periodically (e.g., hourly or daily), in response to obtaining new location characteristic data for certain geographic locations, and/or in response to a user request for information on a particular area.

As described herein, the danger scores generated from the models and/or heuristics can reflect various types of risks that may be found in a location (e.g., risks to health, safety, and/or property). In some embodiments, a single danger score for a location encompasses the different types of risks. In some embodiments, the system generates multiple danger scores for a location where each danger score is associated with a particular type of risk (e.g., for a location, the system generates one danger score associated with risk to property and another danger score associated with risk to health). In some embodiments, the location-based safety alert system generates different danger scores for a location associated with different sources of risk (e.g., for a location, the system generates one danger score associated with crime and another danger score associated with diseases). In some embodiments, the location-based safety alert system generates different danger scores associated with different modes of travel (e.g., for a location, the system generates one danger score associated with traveling to the location by airplane and another danger score associated with traveling to the location by car). In other words, for each location the location-based safety alert system can generate multiple danger scores that characterize different aspects of danger (e.g., what type of danger is posed and what the cause of the danger is) alone and/or in combination (e.g., a danger score that reflects an overall evaluation of multiple aspects).

The location-based safety alert system can maintain data associated with users. Based on this data, the system can determine whether and how to alert users to the existence of potential risks at various locations. For example, for each user, the system maintains an indication of the geographic locations for which the user may receive danger-related alerts (e.g., areas of interest). The areas of interest for a user can include one of both of the geographic locations for which the user has requested alerts and the geographic locations that the system determines may be relevant or of interest to the user. For example, the areas of interest of a user can include the geographic locations that the user has specifically identified as well as the geographic locations that the user has indicated he or she will be traveling to. As a further example, the areas of interest of a user can include the user's current location (e.g., based on the determined location of the user's mobile device) and/or locations identified by the system based on the user's purchases (e.g., based on the user's purchase of airline or other travel tickets or on the user's reservation of a hotel room or other lodging, etc.).

The location-based safety alert system can also maintain, for each user, the user's risk thresholds before the user is alerted to danger-related issues in areas of interest. For example, a first user may wish to be alerted only to events associated with a danger score or other indications corresponding to a high degree of danger, while a second user may wish to be alerted even if a danger score indicates only moderate danger. The risk thresholds can also indicate a sensitivity or tolerance to different sources and/or types of danger. For example, the risk threshold of a first user may indicate that the user has a low tolerance for disease-related danger but is not concerned with weather-related danger, and the risk threshold of a second user may indicate that user has a low tolerance for personal danger and a medium tolerance for danger posed to property. Risk thresholds may be set for users based on explicit indications from users of what type of alerts they wish to receive and/or on feedback from users about whether or not previously received alerts were helpful. The location-based safety alert system can maintain the areas of interest information, the risk thresholds, and other user-related information (e.g., available communication channels and communication channel preferences) in a user profile associated with each user.

Based on the danger scores, the location-based safety alert system can evaluate whether to alert users to any safety-related information. For example, if a user's areas of interest include a geographic location with a sufficiently high danger score, the system can alert the user of the high danger score and/or of the cause of the danger score (e.g., whether a disease outbreak is contributing to that location's danger score, whether a predicted weather pattern is contributing to that location's danger score, etc.). Whether or not a danger score is sufficiently high to cause the system to generate a safety alert may be further based on risk threshold information associated with the user. The alert may include other information, such as service offerings available to the user that can help the user mitigate risk (e.g., options for additional insurance). The user can be alerted via a message from or other notification of a mobile application running on the user's mobile device, via an SMS message, via an email message, and/or via a phone call. The system can determine over which communication channel to alert the user based on the user's preferences and/or the severity of the danger. For example, the system may alert the user by email in connection with a relatively low-danger alert, whereas the system may alert the user via a phone call and mobile application notification for a higher-danger alert. The location-based safety alert system can evaluate the danger scores and/or user-related information to determine whether to generate safety-related alerts periodically (e.g., hourly), when danger scores are updated, and/or upon user request.

There are many types of dangers and risks that can arise at any moment, and a situation that starts as a mere nuisance can escalate to a grave danger. Understandably, it can be impossible for an individual to appreciate and recognize all of the types of risk at a single area (e.g., where they are presently located), let alone the myriad areas that could affect the individual (e.g., where a family member lives, an upcoming travel destination, etc.). Further, while existing alert systems may be able to alert users in very limited circumstances (e.g., a notification of a travel advisory from a government agency), these existing systems are not able to analyze data from myriad sources to generate danger scores that are based on and/or reflect multiple different types of risks. The location-based safety alert system addresses this challenge by obtaining and evaluating volumes of data that describe the situations in various geographic locations. Furthermore, the location-based safety alert system is able to train and retrain models from data for geographic locations and indications of danger and can apply such models as circumstances change in locations throughout the world, thereby transforming the retrieved data into discrete danger scores. Such statistical or machine learning modeling from large datasets, and application to obtained data describing circumstances in various locations, thus both provides a specific improvement in computerized danger analysis and serves as something other than an analog to human mental processes, which would not apply specific modeling techniques or determine transformations in the manner shown herein.

Several implementations are discussed below in more detail in reference to the figures. FIG. 1 is a block diagram illustrating an overview of devices on which some implementations of the disclosed technology can operate. The devices can comprise hardware components of a device 100 that evaluates data associated with geographic locations to determine the danger posed therein and alerts users accordingly. Device 100 can include one or more input devices 120 that provide input to processor(s) 110 (e.g., CPU(s), GPU(s), HPU(s), etc.), notifying it of actions. The actions can be mediated by a hardware controller that interprets the signals received from the input device and communicates the information to processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processor(s) 110 can be a single processing unit or multiple processing units in a device or distributed across multiple devices. Processors 110 can be coupled to other hardware devices, for example, with the use of a bus, such as a PCI bus or SCSI bus. Processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display 130 devices are an LCD display screen; an LED display screen; a projected, holographic, or augmented reality display (such as a heads-up display device or a head-mounted device); and so on. Other input/output devices 140 can also be coupled to the processor, such as a network card, video card, audio card, USB, firewire or other external device, camera, printer, speakers, CD-ROM drive, DVD drive, disk drive, or Blu-ray device.

In some implementations, device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

Processors 110 can have access to a memory 150 in a device or distributed across multiple devices. A memory includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160, which stores programs and software, such as an operating system 162, location-based safety alert system 164, and other application programs 166. Memory 150 can also include data memory 170, e.g., data associated with geographic locations, including public health data, crime data, unrest data, travel advisories, and/or weather data (e.g., location characteristic data); data characterizing the health and/or safety risks posed at geographic locations (e.g., danger scores); computer models to generate danger scores from location characteristic data; configuration data; settings; user options or preferences (e.g., users' areas of interest and/or risk thresholds); etc., which can be provided to program memory 160 or any element of device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
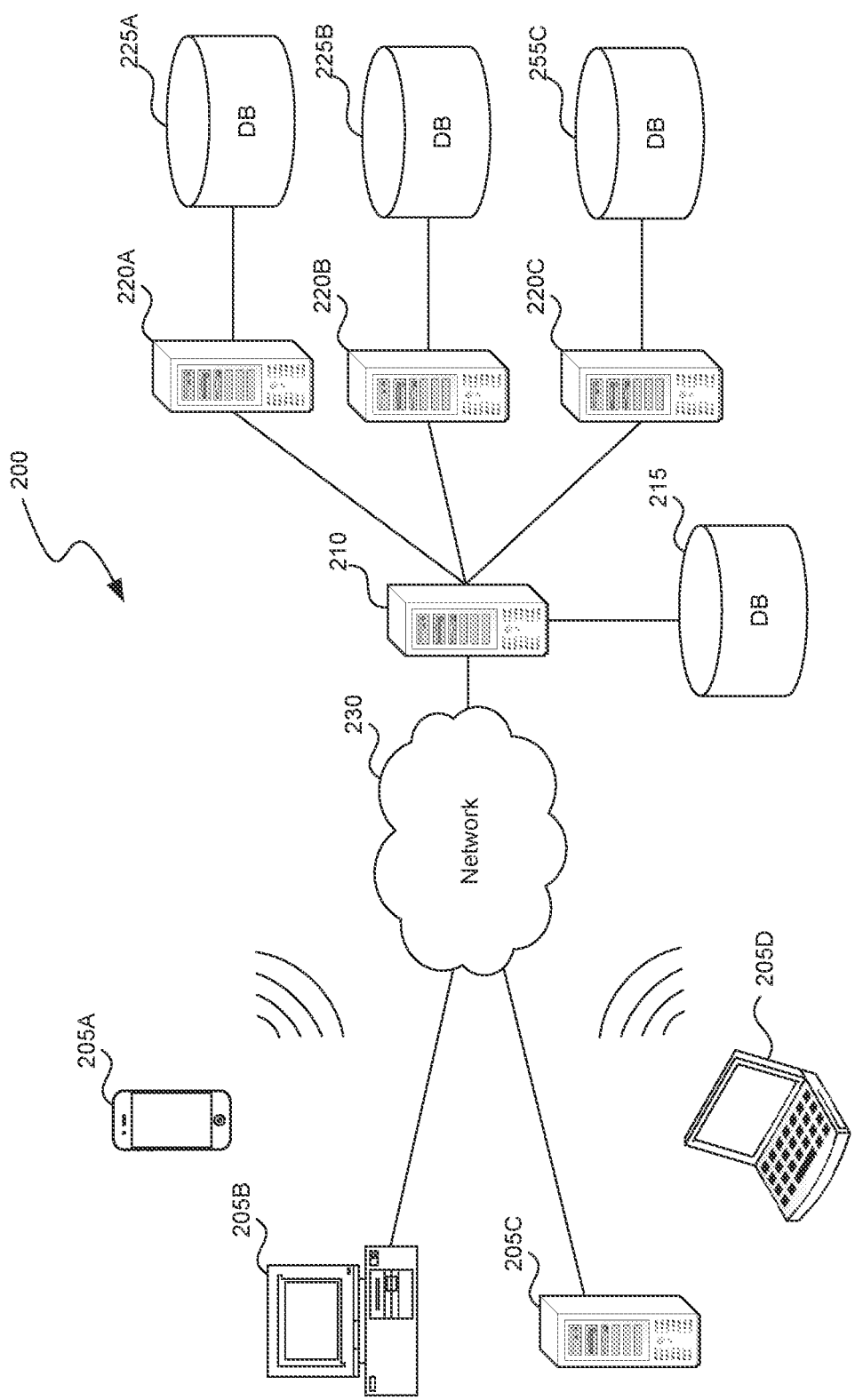
FIG. 2 is a block diagram illustrating an overview of an environment in which some implementations of a location-based safety alert system can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device 210 and 220.

In some implementations, server 210 can be an edge server that receives client requests and coordinates fulfillment of those requests through other servers, such as servers 220A-C. Server computing devices 210 and 220 can comprise computing systems, such as device 100. Though each server computing device 210 and 220 is displayed logically as a single server, each server computing device can be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have its own database. Databases 215 and 225 can warehouse (e.g., store) information such as training data, location characteristic data, and danger scores. Though databases 215 and 225 are displayed logically as single units, databases 215 and 225 can each be a distributed computing environment encompassing multiple computing devices, can be located within its corresponding server, or can be located at the same or at geographically disparate physical locations.

Network 230 can be a local area network (LAN) or a wide area network (WAN), but can also be another wired or wireless network. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
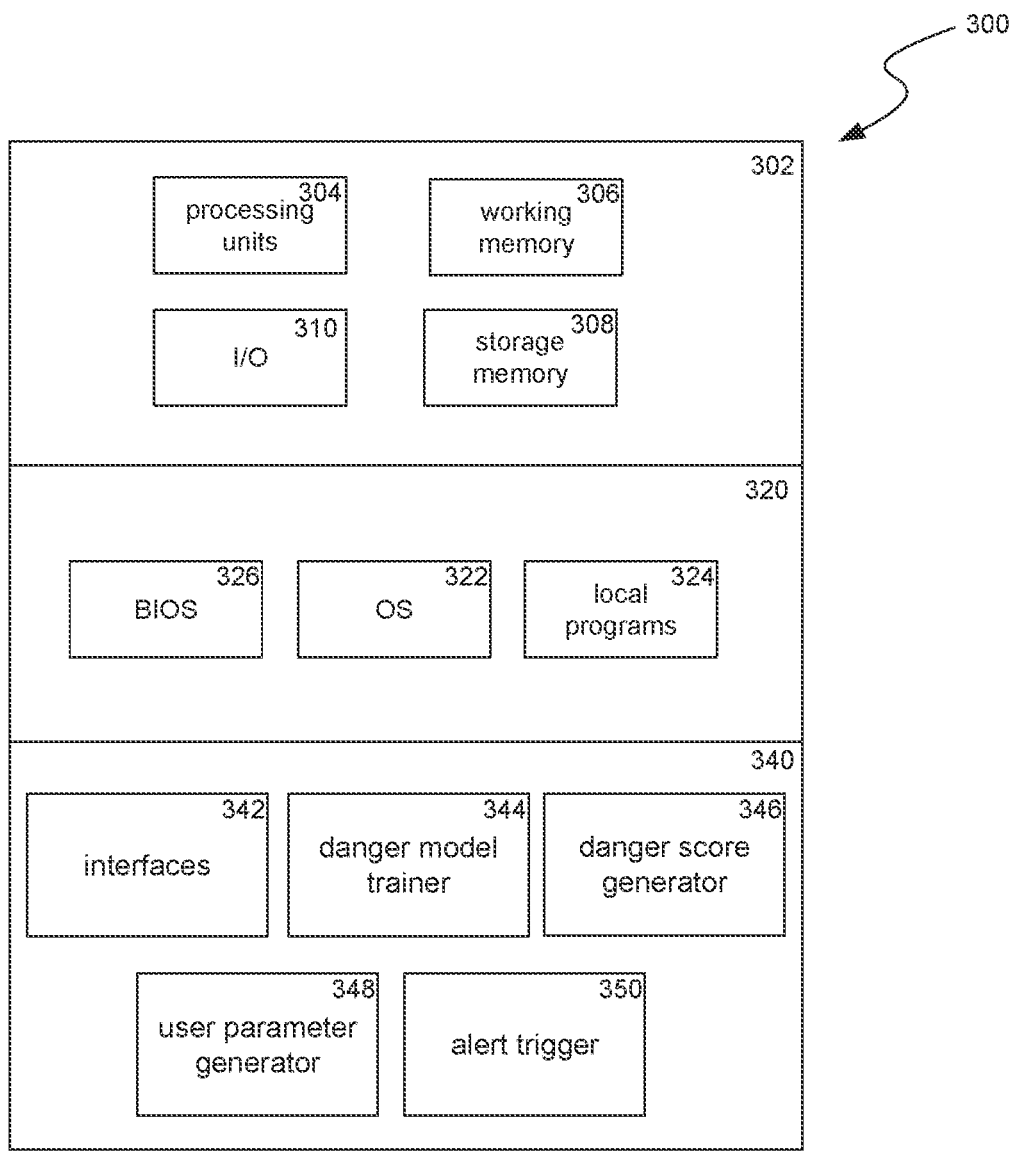
FIG. 3 is a block diagram illustrating components that, in some implementations, can be used in a system employing the disclosed technology.

FIG. 3 is a block diagram illustrating components 300, which, in some implementations, can be used in a system employing the disclosed technology. The components 300 include hardware 302, general software 320, and specialized components 340. As discussed above, a system implementing the disclosed technology can use various hardware, including processing units 304 (e.g., CPUs, GPUs, APUs, etc.), working memory 306, storage memory 308 (local storage or an interface to remote storage, such as database 215 or 225), and input and output devices 310. In various implementations, storage memory 308 can be one or more of the following: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as database 215 or storage provided through another server 220). Components 300 can be implemented in a client computing device, such as client computing devices 205, or on a server computing device, such as server computing device 210 or 220.

General software 320 can include various applications including an operating system 322, local programs 324, and a basic input/output system (BIOS) 326. Specialized components 340 can be subcomponents of a general software application 320, such as local programs 324. Specialized components 340 can include danger model trainer 344, danger score generator 346, user parameter generator 348, alert trigger 350, and components that can be used for providing user interfaces, transferring data, and controlling the specialized components, such as interfaces 342. In some implementations, components 300 can be in a computing system that is distributed across multiple computing devices or can be an interface to a server-based application executing one or more specialized components 340. Although depicted as separate components, specialized components 340 may be logical or other nonphysical differentiations of functions and/or may be submodules or code-blocks of one or more applications.

Danger model trainer 344 trains a computer model for generating danger scores, associated with geographic locations, based on information about the geographic locations. Danger model trainer 344 can utilize training data (e.g., training location characteristic data for a location and a corresponding training danger score) to train a model that can predict danger scores for new data (e.g., new location characteristic data). The model and associated predictions can be refined by, for example, feedback from an operator of a location-based safety alert system and/or feedback from users of the location-based safety alert system. Examples of models include neural networks, support vector machines, Parzen windows, Bayesian networks, clustering, reinforcement learning, probability distributions, decision trees, decision tree forests, and others. Additional details on training a danger score model are provided below in reference to process 400 of FIG. 4.

Danger score generator 346 generates danger scores, characterizing the health and/or safety risks at a geographic location, based on information associated with that location (e.g., location characteristic data). In some implementations of the disclosed technology, danger score generator 346 generates the danger scores based on one or more models created using historical and/or training location characteristic data (e.g., a model trained by danger model trainer 344). In some implementations, danger score generator 346 generates the danger scores using heuristics. Additional details on generating danger scores for geographic locations are provided below in reference to process 500 of FIG. 5.

User parameter generator 348 generates user-specific parameters and, based on these user-specific parameters, customized safety-related alerts can be generated for the user. For example, user parameter generator 348 can determine the areas of interest associated with a given user, which reflect the geographic locations for which the user wishes to receive safety-related alerts. User parameter generator 348 can determine a user's areas of interest based on information received from the user (e.g., an indication from a user that he or she is traveling to a particular location or wants a location to be monitored for safety-related issues) and/or information obtained about the user (e.g., the user's location or the user's purchase history indicating travel plans). As a further example, user parameter generator 348 can determine risk thresholds for a user, which influence the type and severity of safety-related issues that will result in alerting the user. User parameter generator 348 can determine a user's risk thresholds based, for example, on preference information received from the user (e.g., an explicit indication from the user of his or her risk thresholds) and/or feedback from the user (e.g., feedback from the user on whether a previously generated alert was helpful or not). Additional details on generating user-specific parameters are provided below in reference to process 600 of FIG. 6.

Alert trigger 350 generates user alerts to inform users of safety-related issues or risks. For example, alert trigger 350 can evaluate the danger scores for the areas of interest associated with a user and determine whether any of the danger scores necessitate an alert for the user. In some implementations of the disclosed technology, the evaluation of whether danger scores should result in an alert is based on user-specific risk thresholds. The alerts generated by alert trigger 350 can include safety information, including that an area of interest to the user is experiencing a situation that can pose a danger to the user (e.g., that there has been a spike in the crime rate, that there has been a disconcerting rise in spread of a certain disease, etc.). The alerts generated by alert trigger 350 can additionally include information that can help the user mitigate risk, including service offerings for the user (e.g., additional insurance). Additional details on generating user alerts are provided below in reference to process 700 of FIG. 7.

Interfaces 342 generate user interfaces for the system. For example, interfaces 342 can generate interfaces through which an administrator or operator of the system can input training data and update computer models generated from the training data. As a further example, interfaces 342 can generate interfaces through which system users can input information regarding their areas of interest and risk thresholds. As a still further example, interfaces 342 can generate interfaces to display information regarding danger scores and associated safety-related risks at different geographic locations.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
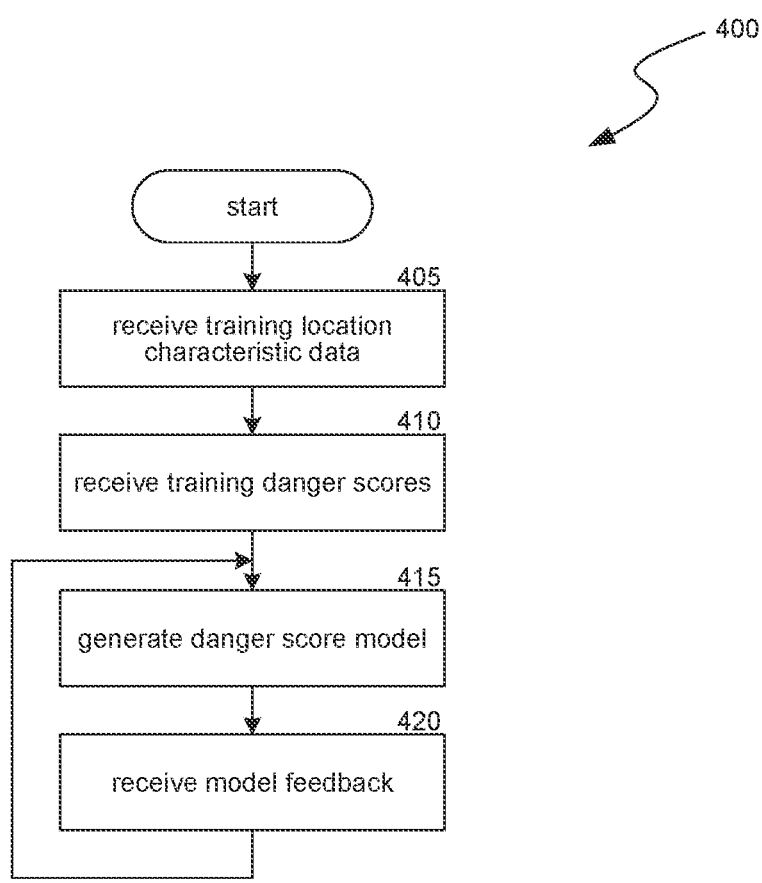
FIG. 4 is a flow diagram illustrating a process used in some implementations of a location-based safety alert system for generating a danger score model.

FIG. 4 is a flow diagram illustrating a process 400, used in some implementations of a location-based safety alert system, for training a computer model to generate danger scores. In some implementations the process 400 can be performed periodically (e.g., hourly, daily, or weekly), when initiated by an operator or administrator of the system, and/or in response to an indication that there is new data available for training the model.

The process 400 begins at block 405, where the system receives location characteristic data to be used for training. The location characteristic data describes various factors that could impact the safety to oneself or one's property at a location. For example, the location characteristic data can include various safety-related public statistics (e.g., disease infection rates, crime data, data describing dissent or unrest, weather data, and/or advisories issued by government agencies). The location characteristic data being used for training can, for example, be synthetic data generated for training purposes and/or historical data that has been previously evaluated by an operator of the system. The training location characteristic data can be natural-language text or structured data (e.g., XML, JSON, database query results, etc.).

At block 410, the process 400 receives danger scores to be used for training. As described herein, each danger score characterizes the extent of danger or safety-related risk at a corresponding location. For example, in some implementations, danger scores can range from 0 to 100, where 0 represents absolutely no risk at the corresponding location and 100 represents extremely grave danger to persons or property at the corresponding location. As a further example, in some implementations, danger scores can be selected from one of several descriptions, such as "high," "medium," and "low." The danger scores can also reflect the different types and sources of risk found, alone and/or in combination, at a location. For example, some danger scores may represent the combined danger at a location caused by the risk of crime and disease. As a further example, there may be multiple danger scores for a location (e.g., a particular city has a crime danger score and a disease danger score), with each danger score reflecting a single type of risk. The danger scores used for training can, for example, be synthetic data generated for training purposes and/or generated from historical data that has previously been evaluated.

At block 415, the process 400 generates a computer model that generates danger scores from location characteristic data, using the training data received at block 405 and 410. For example, elements of the training data scores received at block 410 may be associated with elements of the training location characteristic data received at block 405. The process can evaluate the location characteristic data and corresponding danger scores used for training. Based on this evaluation, the process can generate a model capable of generating danger scores from location characteristic data not found in the training set. Examples of models include neural networks, support vector machines, Parzen windows, Bayesian networks, clustering, reinforcement learning, probability distributions, decision trees, decision tree forests, and others. In training the model, process 400 can provide training location characteristic data to the model (e.g., as a collection of words and/or as a set of statistics conveying facts about the circumstances at different geographic locations). Process 400 can compare output from the model (estimated danger scores) to the desired output for that location (e.g., based on the training danger scores). Based on the comparison, process 400 can modify the model, such as by changing weights between nodes of the neural network or parameters of the functions used at each node in the neural network (e.g., applying a loss function). After applying each of the locations in the training data and modifying the model in this manner, the model is trained to evaluate new standards.

At block 420, the process 400 receives feedback for the danger score model. For example, the feedback could be from a system operator and/or from users and may indicate that a danger score generated by the model is too large or too small. The process then returns to block 415 to retrain the model based on the received feedback. In some implementations, such feedback can be given higher weight in the statistical or machine learning model than the training data items.

Figure 5:
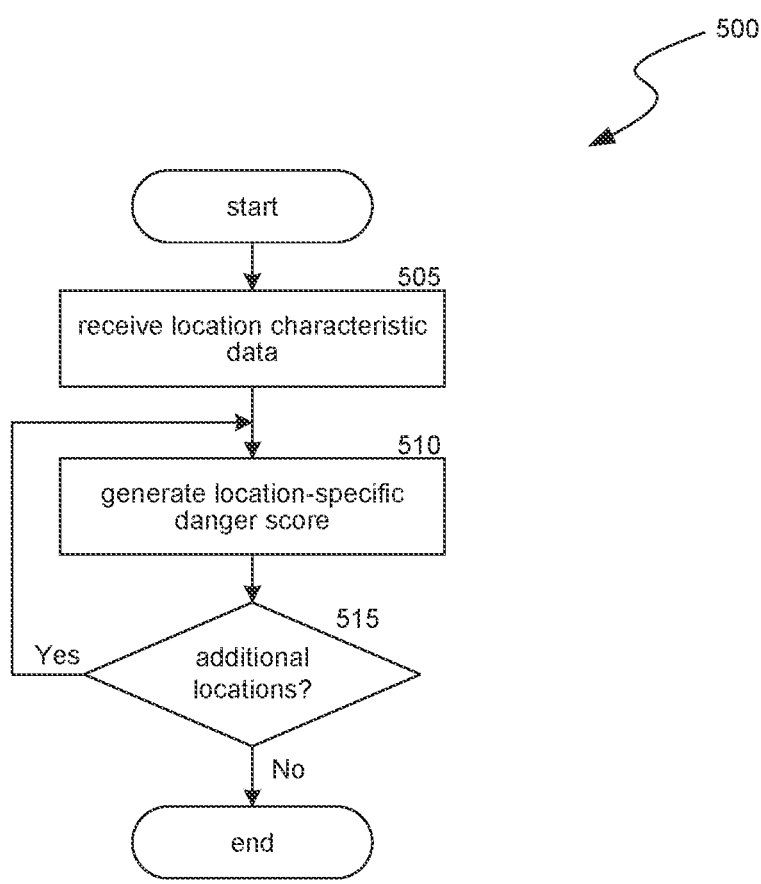
FIG. 5 is a flow diagram illustrating a process used in some implementations of a location-based safety alert system for generating location-specific danger scores.

FIG. 5 is a flow diagram illustrating a process 500, used in some implementations of a location-based safety alert system, for generating location scores for different geographic locations. In some implementations, the process 500 can be performed periodically (e.g., hourly, daily, or weekly), when initiated by an operator or administrator of the system, and/or in response to an indication that there is a new model or new location data for which to generate danger scores.

The process 500 begins at block 505, where the process 500 receives location characteristic data. As described herein, the location characteristic data describes various factors that could impact the safety to oneself or one's property at a geographic location. For example, the location characteristic data can include various safety-related public statistics (e.g., disease infection rates, crime data, data describing dissent or unrest, weather data, and/or advisories issued by government agencies). The location characteristic data can be associated with a neighborhood, a city, a state or region, a country, and/or some other defined geographic boundary.

At block 510, the process 500 generates danger scores for a geographic location corresponding to location characteristic data. For example, the process 500 can generate a danger score associated with and for a particular neighborhood, zip code, area code, city, county, state, country, etc. Danger scores can be generated using a trained model, such as the danger score model illustrated in FIG. 4, and/or using a heuristic that maps location characteristic data to a danger score. In some implementations, the generated danger score for the location reflects a combination of one or more types of danger (e.g., danger to person and property) and/or one or more sources of danger (e.g., danger of disease, crime, unrest, weather, etc.). In some implementations, the process 500 at block 510 generates multiple danger scores for a location, each of which reflects a single type and/or source of danger (e.g., a property danger score, a disease danger score, a crime danger score, etc.). In some implementations, the process 500 generates different danger scores associated with different modes of travel (e.g., for a location, the system generates one danger score associated with traveling to the location by airplane and another danger score associated with traveling to the location by car). By utilizing a broad set of publicly available data describing ongoing and imminent situations in geographic locations and captured in the location characteristic data (e.g., crime data, disease data, weather data, travel alerts, government agency reports of unrest, and/or news coverage regarding crimes to persons and property), the process 500 can generate a variety of danger scores that characterize different types of risks posed to persons or property at a location. Thus, a location-aware alert system can tailor alerts to individual users based on their own risk tolerances, their modes of travel to the corresponding location, etc.

At decision block 515, the process 500 determines whether there are any additional locations for which danger scores need to be generated. For example, at block 505, the process 500 may have received location characteristic data for a city (e.g., crime and weather data for the city, news reports about the city, etc.). After generating a damage score for one boundary encompassed by the city (e.g., a neighborhood), the process 500 can generate damage scores for other boundaries encompassed by the city (e.g., a different neighborhood, the city as a whole, etc.). That is, the process 500 can evaluate location characteristic data associated with, and generate danger scores for, geographic regions of varying scope and size, from small neighborhoods to entire countries.

If at decision block 515 the process 500 determines that there are additional locations for which to generate danger scores, then the process 500 returns to block 510 to generate a danger score for the additional location. If at decision block 515 it is determined that there are no additional locations, then the process ends.

Figure 6:
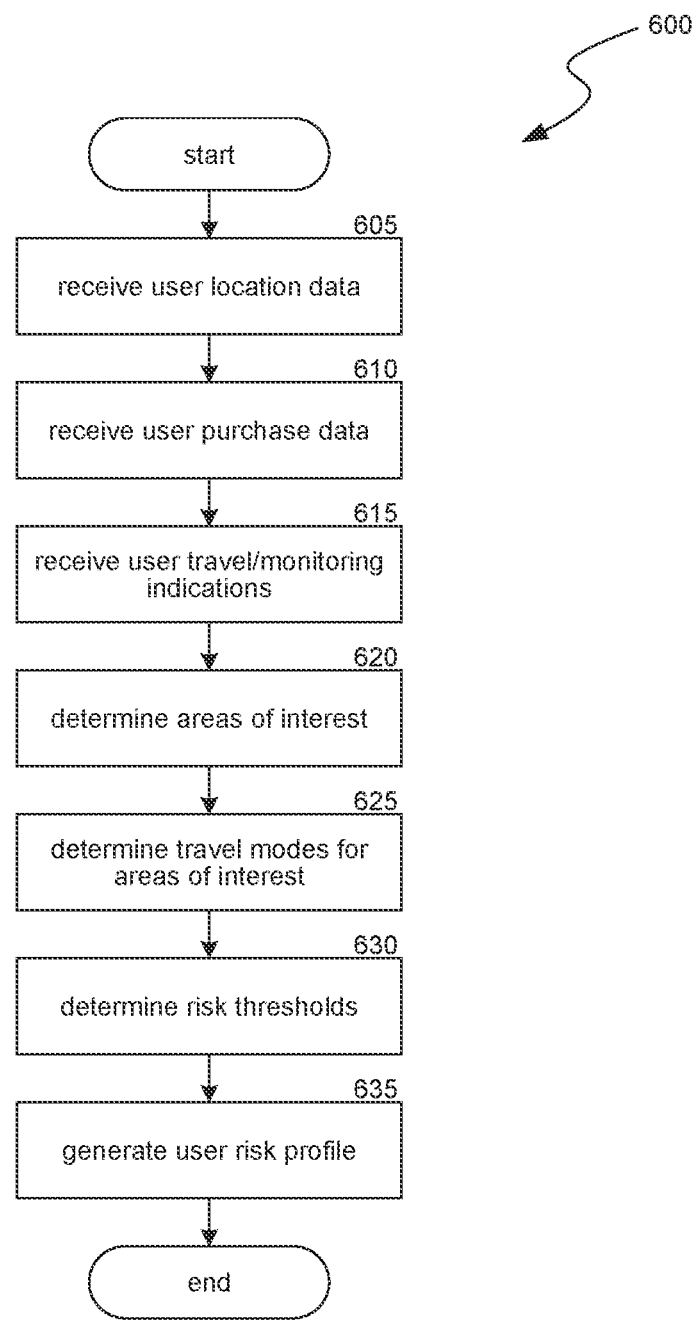
FIG. 6 is a flow diagram illustrating a process used in some implementations of a location-based safety alert system for generating a user risk profile.

FIG. 6 is a flow diagram illustrating a process 600, used in some implementations of a location-based safety alert system, for generating a risk profile associated with a user. In some implementations, the process 600 can be performed periodically (e.g., hourly, daily, or weekly), when requested by the user, and/or in response to an indication that there is new data (e.g., updated danger scores or user data).

The process 600 begins at block 605, where the process 600 receives user location data. User location data can be obtained from a mobile device associated with the user using, for example, Global Positioning System (GPS), Assisted GPS (A-GPS), or other mobile-based location-determination techniques.

At block 610, the process 600 receives purchase data for the user. For example, the user may consent to have his or her purchase data from banks and/or credit cards shared with a location-based safety alert system. The purchase data can include purchases indicative of travel to a geographic location. For example, the purchase data can indicate the purchase of a train ticket, airplane ticket, hotel reservation, home lodging rental, or other data. As a further example, the purchase data can indicate the location at which a purchase has been recently made (e.g., at a point of sale).

At block 615, the process 600 receives user-provided indications of travel destinations and/or areas to be monitored. For example, the user of a location-based alert system may enter, through a system interface, information regarding his or her upcoming travel plans. As a further example, the user may select certain areas for which the user wishes to receive danger notifications (e.g., a city where a friend or family member lives).

At block 620, the process 600 determines the areas of interest for the user. The user's areas of interest may be generated from a combination of the user's location, the user's purchase data, and the user-provided indications (described in reference to blocks 605-615). For example, if a user is located in Toledo, Ohio, has purchased airfare to Albuquerque, New Mexico, and has indicated he has a sister living in New York, New York, then all three cities may be designated as areas of interest for the user.

At block 630, the process 600 determines risk thresholds for the user. As described herein, a user's risk thresholds characterize the user's tolerance for different types of risks, which in turn can influence whether or not to alert the user to certain dangers. For example, a user with a high threshold for disease-related risks may not be alerted to any dangers predominantly arising from the risk of catching a disease. In various implementations the risk threshold is based on user-provided indications of his or her risk tolerance, default values, or a mapping of user characteristics (e.g., age, geographic location, biographics, etc.) to expected risk thresholds. In some the risk thresholds can be adjusted based on user feedback. For example, if the user is alerted to a severe weather storm in an area of interest and provides feedback to the system that he or she is not concerned by it, then the user's risk threshold may be adjusted such that future weather-related risks will result in an alert only if they are even more extreme. In some implementations, the process 600 determines, for a user, different risk thresholds corresponding to different sources and/or types of risk. That is, a user may have one threshold for disease-related risk and another for crime-related risk.

At block 635, the process 600 generates a risk profile for the user. The risk profile can include, for example, the user's areas of interest and the user's risk thresholds. The process 600 can then end.

Figure 7:
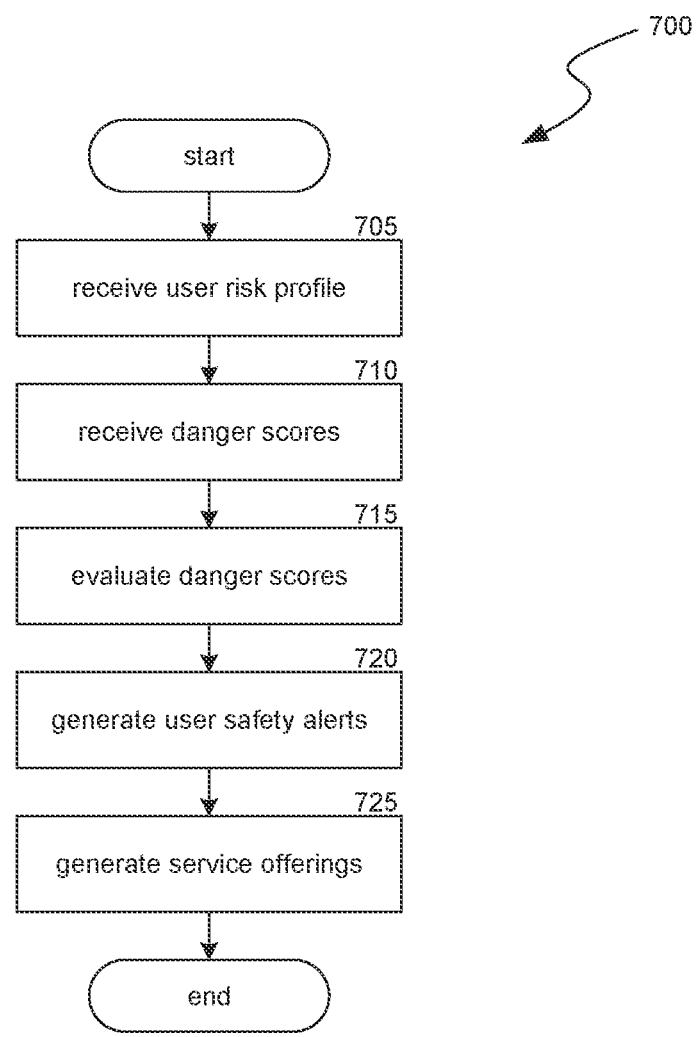
FIG. 7 is a flow diagram illustrating a process used in some implementations of a location-based safety alert system for generating user alerts.

FIG. 7 is a flow diagram illustrating a process 700, used in some implementations of a location-based safety alert system, for generating user alerts. In some implementations, the process 700 can be performed periodically (e.g., hourly, daily, or weekly), when requested by the user, and/or in response to an indication that there is new data (e.g., updated danger scores or user risk profile).

The process 700 begins at block 705, where the process receives a risk profile associated with a user. As described herein, the user's risk profile can include the areas of interest for the user. In some implementations, the risk profile additionally includes the user's risk thresholds. The received risk profile could have been generated, for example, by the process 600 illustrated in FIG. 6.

At block 710, the process 700 receives danger scores. As described herein, danger scores characterize the severity and type of dangers found in a geographic location. The danger score may be generated, for example, by the process 500 illustrated in FIG. 5. In some implementations, the process 700 receives the danger scores only for the user's areas of interest (as indicated by the user's risk profile).

At block 715, the process 700 evaluates the received danger scores in connection with the user's risk profile to determine whether the user should be alerted to any safety-related issues. In some implementations, the process 700 evaluates the danger scores corresponding to each of the user's areas of interest to determine whether any danger scores are sufficient to trigger an alert. In some implementations, whether or not a danger score is sufficient to trigger an alert is based on user-specific risk thresholds. For example, an area of interest may have a weather-related danger score of 80/100, and the user may have a weather-related risk threshold of 85/100; in this example, no weather-related alert would be generated based on the danger score. As a further example, an area of interest may have a crime-related danger score of 60/100, and the user may have a crime-related risk threshold of 50/100; in this example, the user will be alerted to the crime-related danger at the area of interest. In some implementations, whether or not a danger score is sufficient to trigger an alert is based on a configurable threshold of a location-based safety alert system. For example, the system may have a systemwide threshold of 75/100 to generate an alert; using the example danger scores above, the system would alert the user to the weather-related danger but not the crime-related danger.

At block 720, the process 700 generates safety-related alerts for the user. The alerts can include information such as the geographic location for the alert as well as the cause of the alert. For example, the alert can indicate the nature of the risk (e.g., a crime risk, a weather risk, etc.) as well as the severity of the risk (e.g., moderate danger, severe danger, etc.). The generated alerts can be provided to the user via one or more communication channels, such as through an application running on the user's mobile device, via an SMS text message, over email, via a phone call, etc. In some implementations, the process selects the communication channel for alerting the user based on the user's preferences. In some implementations, the process selects the communication channel for alerting the user based on the severity of the danger. For example, a safety-related alert associated with a relatively moderate danger may be transmitted to the user over email, while a safety-related alert associated with extreme and imminent danger may be transmitted to the user via a phone call and a notification through an application on the user's mobile device.

At block 725, the process 700 generates service offerings for the user based on the generated safety-related alerts. For example, the process 700 can provide the user with the option to purchase additional travel insurance and/or car insurance in connection with a location for which a safety-related alert was generated. As a further example, the process 700 can notify the user of destinations within a geographic location that the user can safely visit to, for example, avoid weather-related risks (e.g., indoor entertainment spaces when a monsoon is predicted). The process 700 then ends.

Figure 8:
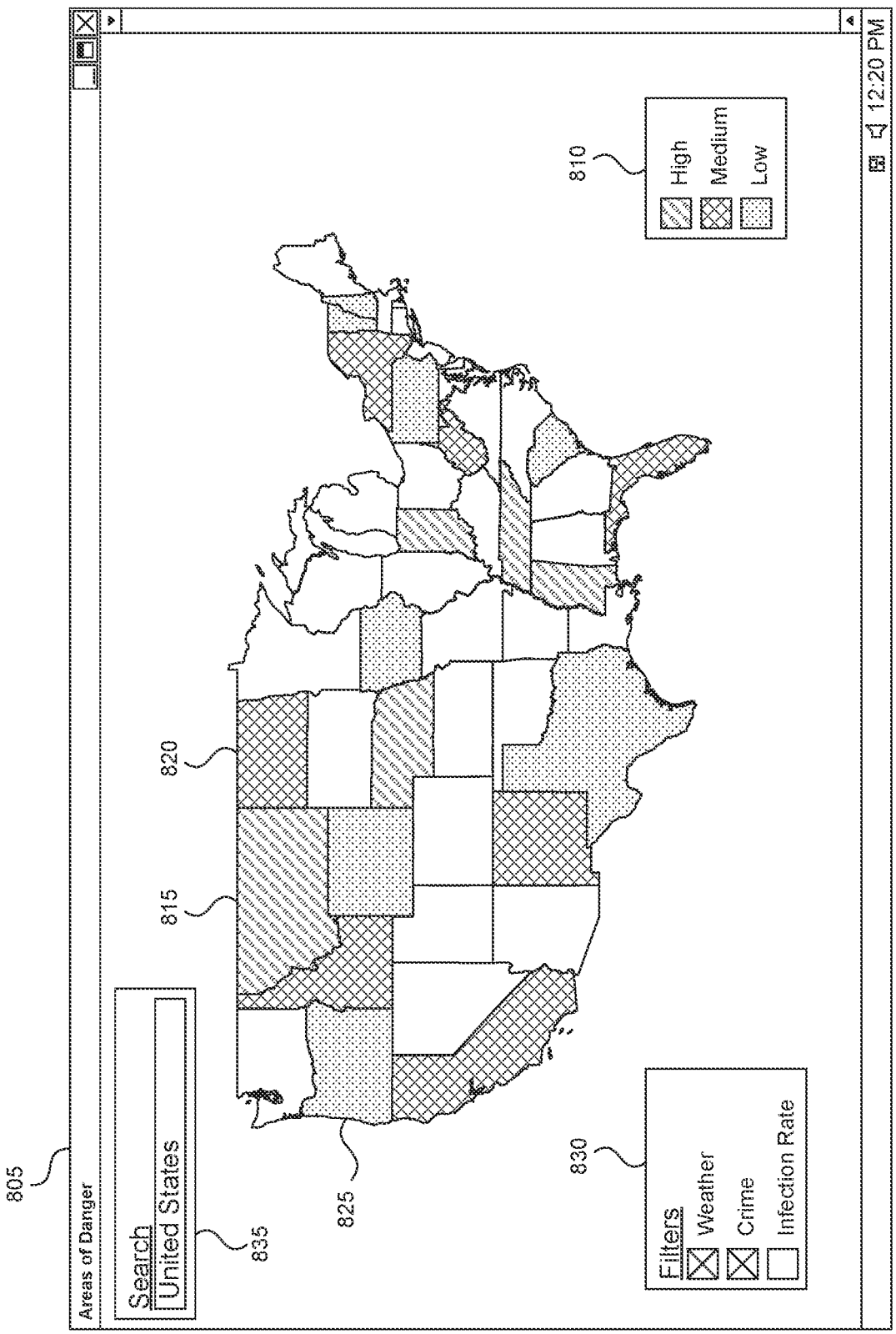
FIG. 8 is a conceptual diagram illustrating an example user interface used in some implementations of a location-based safety alert system.

FIG. 8 is a conceptual diagram illustrating an example user interface 805, used in some implementations of a location-based safety alert system. The interface 805 can be used, for example, to indicate areas of danger to a user. Different geographic areas can be associated with different degrees of danger (e.g., high, medium, and low) as indicated by legend 810. For example, in the representative illustration of the United States, a first state 815 is associated with a high degree of danger, a second state 820 is associated with a medium degree of danger, and a third state 825 is associated with a low degree of danger. In some implementations, danger information is displayed only for those geographic regions that are areas of interest for the viewing user. In some implementations, the user can view the system-generated danger information for all geographic regions, even those that are not among his or her areas of interest.

In some implementations, users can filter the displayed results according to various types selectable using filters 830. For example, the map can be updated to show which areas have high, medium, or low danger for just weather and crime types of danger if these are the two filters selected. In some implementations, users can select different areas, e.g., by scrolling on the map or by searching for a new area using search control 835.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described that may be exhibited by some implementations and not by others. Similarly, various requirements are described that may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, and C, or any combination thereof, such as any of the following: A; B; C; A and B; A and C; B and C; A, B, and C; or multiple instances of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

The following examples provide further representative implementations of the presently disclosed technology.

We claim:

1. A method, performed by a computing system, for alerting users to safety-related issues for geographic locations through a transformation of geographic location characteristic data into models and application of the models to geographic location specifics, the method comprising:
   receiving geographic location characteristic data, wherein the geographic location characteristic data comprises, for corresponding geographic locations, danger conditions including one or more of: health statistics, safety statistics, weather statistics, or a combination thereof;
   generating a danger score model, that includes one or more neural network machine learning models, that is trained to receive an indication of a geographic location and produce a danger score for the given geographic location, by building the danger score model using multiple training items, each training item corresponding to one of the instances of the geographic location characteristic data,
      wherein each training item, corresponding to a particular geographic location, is created by:
         computing a danger score for the geographic location using the health statistics, safety statistics, weather statistics, or a combination thereof, from the corresponding geographic location characteristic data; and
         pairing the particular geographic location to the computed danger score; and
      wherein building the danger score model includes training the one or more neural network machine learning models by, for each particular training item of the multiple training items:
         providing input, to the one or more neural network machine learning models, based on the particular geographic location of the particular training item;
         in response to providing the input to the one or more neural network machine learning models, receiving from the one or more neural network machine learning models a predicted danger score for the particular geographic location of the particular training item;
         computing a loss function value, the loss function value indicating a difference between the predicted danger score and the danger score paired to the input, that was provided to the one or more neural network machine learning models and that was based on the particular geographic location of the particular training item; and
         based on the loss function value, modifying aspects of the one or more neural network machine learning models;
   identifying one or more geographic areas of interest associated with a user;
   generating one or more danger scores by applying, to the danger score model, geographic location characteristic data, for at least the one or more geographic areas of interest, wherein the geographic location characteristic data, for at least the one or more geographic areas of interest, includes one or more of: health statistics, safety statistics, weather statistics, or a combination thereof; and
   determining at least one of the one or more danger scores exceed one or more corresponding risk thresholds, and in response:
      generating a safety alert based on the determination; and
      transmitting the safety alert to the user.

2. The method of claim 1, wherein identifying the one or more geographic areas of interest associated with the user is based on one or more of: purchase data associated with the user, a device-obtained location of the user, a user-provided indication of a geographic location to monitor, or any combination thereof.

3. The method of claim 1, wherein generating the one or more danger scores corresponding to the one or more geographic areas of interest is further based on geographic location characteristic data associated with the one or more geographic areas of interest.

4. The method of claim 1, wherein the danger score model is further generated by transforming the geographic location characteristic data into one or more statistical models.

5. The method of claim 1,
   wherein each training item identifies the particular geographic location using a collection of words or statistics representing the particular geographic location.

6. The method of claim 1, wherein each of the one or more danger scores characterizes at least one of a property-related risk, a disease-related risk, a crime-related risk, or a weather-related risk.

7. The method of claim 1 further comprising determining a mode of travel of the user to the one or more geographic areas of interest, wherein the determining that at least one of the one or more danger scores exceed one or more corresponding risk thresholds is based further on the mode of travel of the user to the one or more geographic areas of interest.

8. A non-transitory computer-readable storage medium storing instructions that, when executed by a computing system, cause the computing system to perform a process for alerting users to safety-related issues for geographic locations through a transformation of geographic location characteristic data into models and application of the models to geographic location specifics, the process comprising:
   receiving geographic location characteristic data, wherein the geographic location characteristic data comprises, for corresponding geographic locations, danger conditions including one or more of: health statistics, safety statistics, weather statistics, or a combination thereof;

generating a danger score model, that includes one or more neural network machine learning models, that is trained to receive an indication of a geographic location and produce a danger score for the given geographic location, by building the danger score model using multiple training items, each training item corresponding to one of the instances of the geographic location characteristic data, wherein each training item, corresponding to a particular geographic location, is created by:

computing a danger score for the geographic location using the health statistics, safety statistics, weather statistics, or a combination thereof, from the corresponding geographic location characteristic data; and pairing the particular geographic location to the computed danger score; and wherein building the danger score model includes training the one or more neural network machine learning models by, for each particular training item of the multiple training items:

providing input, to the one or more neural network machine learning models, based on the particular geographic location of the particular training item;

in response to providing the input to the one or more neural network machine learning models, receiving from the one or more neural network machine learning models a predicted danger score for the particular geographic location of the particular training item;

computing a loss function value, the loss function value indicating a difference between the predicted danger score and the danger score paired to the input, that was provided to the one or more neural network machine learning models and that was based on the particular geographic location of the particular training item; and based on the loss function value, modifying aspects of the one or more neural network machine learning models;

identifying one or more geographic areas of interest associated with a user;

generating one or more danger scores by applying, to the danger score model, geographic location characteristic data, for at least the one or more geographic areas of interest, wherein the geographic location characteristic data, for at least the one or more geographic areas of interest, includes one or more of: health statistics, safety statistics, weather statistics, or a combination thereof; and determining at least one of the one or more danger scores exceed one or more corresponding risk thresholds, and in response:

generating a safety alert based on the determination; and transmitting the safety alert to the user.

9. The non-transitory computer-readable storage medium of claim 8, wherein identifying the one or more geographic areas of interest associated with the user is based on one or more of: purchase data associated with the user, a device-obtained location of the user, a user-provided indication of a geographic location to monitor, or any combination thereof.

10. The non-transitory computer-readable storage medium of claim 8, wherein generating the one or more danger scores corresponding to the one or more geographic areas of interest is further based on geographic location characteristic data associated with the one or more geographic areas of interest.

11. The non-transitory computer-readable storage medium of claim 8, wherein the danger score model is further generated by transforming the geographic location characteristic data into one or more statistical models.

12. The non-transitory computer-readable storage medium of claim 8, wherein each training item identifies the particular geographic location using a collection of words or statistics representing the particular geographic location.

13. The non-transitory computer-readable storage medium of claim 8, wherein each of the one or more danger scores characterizes at least one of a property-related risk, a disease-related risk, a crime-related risk, or a weather-related risk.

14. The non-transitory computer-readable storage medium of claim 8, wherein the process further comprises determining a mode of travel of the user to the one or more geographic areas of interest, wherein the determining that at least one of the one or more danger scores exceed one or more corresponding risk thresholds is based further on the mode of travel of the user to the one or more geographic areas of interest.

15. A computing system for alerting users to safety-related issues for geographic locations through a transformation of geographic location characteristic data into models and application of the models to geographic location specifics, the computing system comprising:

one or more processors; and one or more memories storing instructions that, when executed by the one or more processors, cause the computing system to perform a process comprising:

receiving geographic location characteristic data, wherein the geographic location characteristic data comprises, for corresponding geographic locations, danger conditions including one or more of: health statistics, safety statistics, weather statistics, or a combination thereof;

generating a danger score model, that includes one or more neural network machine learning models, that is trained to receive an indication of a geographic location and produce a danger score for the given geographic location, by building the danger score model using multiple training items, each training item corresponding to one of the instances of the geographic location characteristic data, wherein each training item, corresponding to a particular geographic location, is created by:

computing a danger score for the geographic location using the health statistics, safety statistics, weather statistics, or a combination thereof, from the corresponding geographic location characteristic data; and pairing the particular geographic location to the computed danger score; and wherein building the danger score model includes training the or more neural network machine learning models by, for each particular training item of the multiple training items:

providing input, to the one or more neural network machine learning models, based on the particular geographic location of the particular training item;

in response to providing the input to the one or more neural network machine learning models, receiving from the one or more neural network machine learning models a predicted danger score for the particular geographic location of the particular training item;

computing a loss function value, the loss function value indicating a difference between the predicted danger score and the danger score paired to the input, that was provided to the one or more neural network machine learning models and that was based on the particular geographic location of the particular training item; and based on the loss function value, modifying aspects of the one or more neural network machine learning models;

identifying one or more geographic areas of interest associated with a user;

generating one or more danger scores by applying, to the danger score model, geographic location characteristic data, for at least the one or more geographic areas of interest, wherein the geographic location characteristic data, for at least the one or more geographic areas of interest, includes one or more of: health statistics, safety statistics, weather statistics, or a combination thereof; and determining at least one of the one or more danger scores exceed one or more corresponding risk thresholds, and in response:

generating a safety alert based on the determination; and transmitting the safety alert to the user.

16. The computing system of claim 15, wherein identifying the one or more geographic areas of interest associated with the user is based on purchase data associated with the user.

17. The computing system of claim 15,
wherein each training item identifies the particular geographic location using a collection of words or statistics representing the particular geographic location.

18. The computing system of claim 15, wherein the generating the one or more danger scores is performed prior to the identifying the one or more geographic areas of interest by:

generating multiple danger scores for multiple areas; and once the one or more geographic areas of interest associated with a user are identified, selecting the danger scores, from the multiple danger scores for multiple areas, corresponding to the identified the one or more geographic areas of interest.

19. The method of claim 1, wherein the generating the one or more danger scores is performed prior to the identifying the one or more geographic areas of interest by:

generating multiple danger scores for multiple areas; and once the one or more geographic areas of interest associated with a user are identified, selecting the danger scores, from the multiple danger scores for multiple areas, corresponding to the identified the one or more geographic areas of interest.

20. The non-transitory computer-readable storage medium of claim 8, wherein the generating the one or more danger scores is performed prior to the identifying the one or more geographic areas of interest by:

generating multiple danger scores for multiple areas; and once the one or more geographic areas of interest associated with a user are identified, selecting the danger scores, from the multiple danger scores for multiple areas, corresponding to the identified the one or more geographic areas of interest.

* * * * *